United States Patent
Socolsky

(10) Patent No.: US 10,772,266 B2
(45) Date of Patent: Sep. 15, 2020

(54) DRIP EMITTER AND MEMBRANE FOR A DRIP EMITTER

(71) Applicant: Netafim, Ltd., Tel Aviv (IL)

(72) Inventor: Esteban Socolsky, Kibbutz Hatzerim (IL)

(73) Assignee: Netafim, Ltd., Tel Aviv (IL)

( * ) Notice: Subject to any disclaimer, the term of this patent is extended or adjusted under 35 U.S.C. 154(b) by 44 days.

(21) Appl. No.: 15/920,818

(22) Filed: Mar. 14, 2018

(65) Prior Publication Data

US 2018/0199524 A1    Jul. 19, 2018

Related U.S. Application Data

(63) Continuation of application No. PCT/IB2016/055412, filed on Sep. 11, 2016.

(60) Provisional application No. 62/219,909, filed on Sep. 17, 2015.

(51) Int. Cl.
*A01G 25/02*    (2006.01)

(52) U.S. Cl.
CPC ................. *A01G 25/023* (2013.01)

(58) Field of Classification Search
CPC ...... A01G 25/02; A01G 25/023; A01G 25/06; A01G 2025/006
USPC ........................................... 239/542
See application file for complete search history.

(56) References Cited

U.S. PATENT DOCUMENTS

| | | | |
|---|---|---|---|
| 5,183,208 A | | 2/1993 | Cohen |
| 5,294,058 A | * | 3/1994 | Einav ............... A01G 25/023 239/533.1 |
| 2006/0237561 A1 | * | 10/2006 | Park .................. A01G 25/023 239/542 |
| 2009/0302127 A1 | | 12/2009 | Lutzki et al. |
| 2014/0110506 A1 | | 4/2014 | Mavrakis et al. |

OTHER PUBLICATIONS

International Search Report dated Jan. 12, 2017, in counterpart International (PCT) application (No. PCT/IB2016/055412).
Written Opinion dated Jan. 12, 2017, in counterpart International (PCT) application (No. PCT/IB2016/055412).

* cited by examiner

*Primary Examiner* — Darren W Gorman
(74) *Attorney, Agent, or Firm* — Womble Bond Dickinson (US) LLP

(57) ABSTRACT

A membrane for a drip emitter includes at least two first and second regions. The regions are of different thickness.

25 Claims, 2 Drawing Sheets

DRIP EMITTER AND MEMBRANE FOR A DRIP EMITTER

RELATED APPLICATIONS

This is a Bypass Continuation of PCT/IB2016/055412 filed Sep. 11, 2016 and published as WO 2017/046686A1, which claims priority to U.S. Provisional Patent Application No. 62/219,909 filed Sep. 17, 2015. The contents of the aforementioned applications are incorporated by reference in their entirety.

TECHNICAL FIELD

Embodiments of the invention relate to a drip emitter and a membrane for a drip emitter, and in particular to the design of the membrane for its intended use in the emitter.

BACKGROUND

Membranes can be used for various purposes in irrigation drip emitters in connection to waterways formed in the emitter. For example, a membrane may be used for controlling the flow rate of water discharged by the emitter, for sealing between parts of the emitter, for defining valves in the emitter and/or for defining flow-paths within the emitter.

In control of flow rate, for example, the membrane operates to control liquid flow out of the emitter so that it is substantially independent of pressure at an inlet of the emitter for a range of pressures typically encountered in irrigation applications. For this purpose, the membrane is normally located between inlet and outlet waterways of the emitter and in response to increase in pressure of the entering water undergoes distortion that operates to increase resistance to liquid flow through and out of the emitter.

When used, in another example, for defining flow path waterways by e.g. sealing between parts of the emitter, the membrane may be pressed between body members of the emitter and/or be fitted to overlie waterway grooves in one or more body members of the emitter; in order to define waterway flow paths through the emitter by e.g. sealing areas of the emitter against egress of liquid.

Optimal design and/or shape of membranes for drip emitters may thus differ depending on the purpose for which it is used in the emitter. For example, a membrane used for flow rate control, may require certain specific elastic properties while for defining flow paths in the emitter additional and/or other considerations may be applicable.

U.S. Pat. No. 4,210,287 discloses an emitter unit provided with a resiliently flexible membrane, which is releasably retained within a body member so as to serve a double function. On the one hand, whilst being exposed to the irrigation flow pressure in the conduit to serve in exercising differential pressure control, and, on the other hand, to define, with respect to a flow restricting waterway groove formed in the body member, a flow-restricting waterway flow-path.

SUMMARY

The following embodiments and aspects thereof are described and illustrated in conjunction with systems, tools and methods which are meant to be exemplary and illustrative, not limiting in scope.

In an embodiment there is provided a membrane for a drip emitter comprising at least two first and second regions of different thickness.

Possibly, the membrane comprises a transition between the thicknesses of the two regions, where said transition is in membrane height measured in the thickness direction. Possibly the transition is a step-wise transition.

Typically, the membrane comprises upper and lower sides and a peripheral surface extending between the two sides, and wherein membrane thickness or height is measured between the two sides, preferably along an imaginary line perpendicularly intersecting at least one of the sides.

Possibly, one of the upper or lower sides is substantially continuously planar along the at least two regions and the transition being formed on the other side. The side being planar along at least two regions being preferable for sealing adjacent waterways formed on a same part of an emitter and opening out at a similar given height out of said emitter part. Said adjacent waterways possibly communicating one with the other via a merge opening out of said emitter part also at said given height.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1:
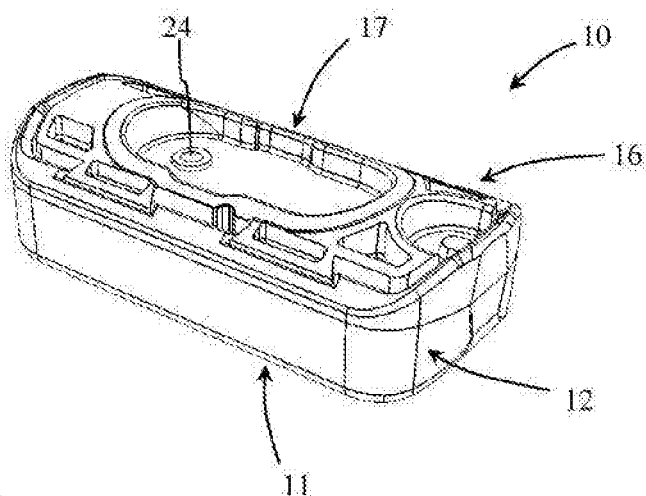
FIG. 1 schematically shows a perspective view of a drip emitter in accordance with an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is drawn to FIG. 1 showing a drip emitter 10 according to an embodiment of the present invention. The embodiment of emitter 10 may include two body members 12, 16. A first one of the body members 12 acting in this example as a receiving member and a second one of the body members 16 acting in this example as a cover member that is here partially received within member 12.

Figure 2:
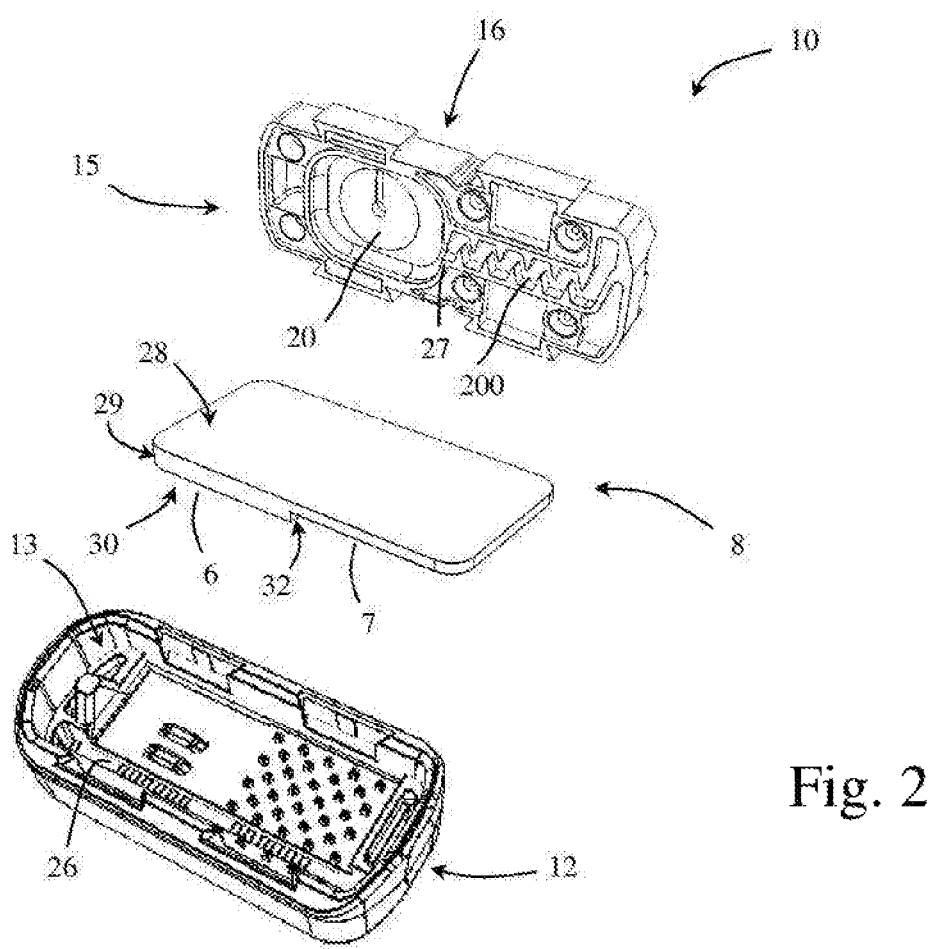
FIG. 2 schematically shows an exploded view of the emitter of FIG. 1 exposing a membrane in accordance with an embodiment of the present invention.

FIG. 2 schematically shown an exploded view of FIG. 1 in which the receiving and cover members 12, 16 have been slightly flipped to reveal their respective inner sides 13, 15 facing into the emitter. In an assembled state of emitter 10, the body members of the emitter sandwich therebetween an elastic membrane 8 that overlies at least portions of the inner side 13, 15 of each member 12, 16.

Each one of the body members 12, 16 also includes a respective outer side 11, 17 facing out of the emitter. The outer side 17 of body member 16 may be configured to face an inner face of an irrigation pipe (not shown) and the emitter may be attached possibly by heat bonding to the pipe at the outer side 17 of member 16. The outer side 11 of member 12 may be configured to face an interior of the irrigation pipe where pressurized irrigation liquid is configured to flow.

In the example shown, emitter 10 includes in body member 16 two waterways 20, 200; in this example, a recess 20 and an elongated groove 200. Both recess 20 and groove 200 are here seen formed in and opening out of the inner side 15 of member 16. Recess 20 in this example may be configured to act as a pressure regulating/control chamber when overlaid by membrane 8 in an assembled state of emitter 10.

Recess 20 communicates via an aperture formed here at its center with an outlet waterway 24 of the emitter opening out at the emitter at outer side 17. Groove 200 in this example is shown as a pressure reducing waterway labyrinth including optional opposing arrays of baffle teeth for reducing flow rate through the emitter. Body member 12 also includes an inlet waterway 26 of the emitter, optionally in the form of an elongated filter type waterway channel that communicates between the inner and outer side 11, 13 of member 12.

Membrane 8 in this embodiment includes upper and lower sides 28, 30 and a peripheral surface 29 extending between its two sides 28, 30. Upper side 28 in the example shown is substantially planar along its entire extension and inner side includes a transition 32 dividing membrane 8 into first and second regions 6, 7 with different thicknesses as measured between the upper and lower sides 28, 30.

Figure 3:
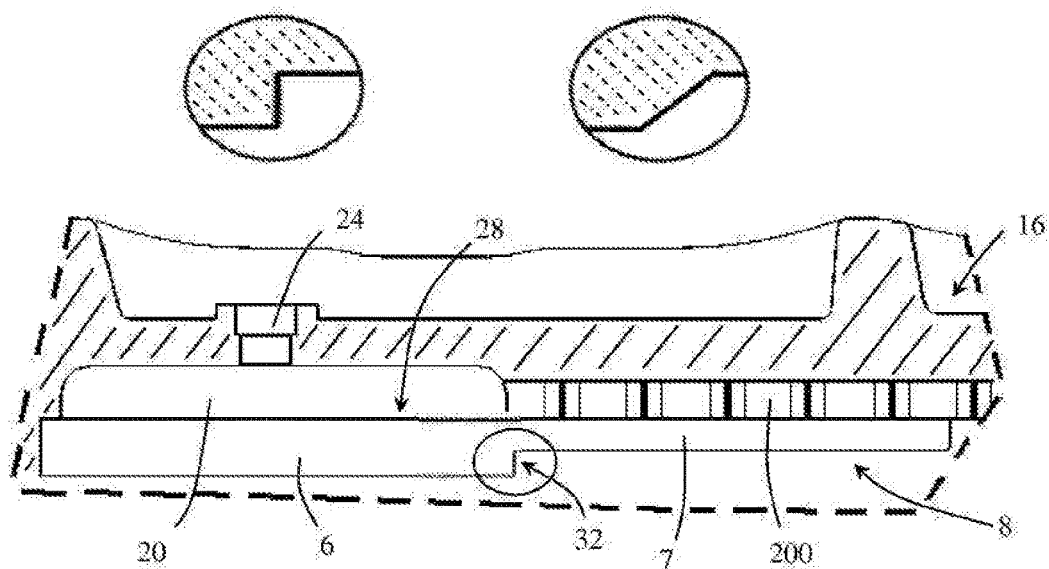
FIG. 3 schematically shows a partial cross section of the emitter of FIG. 1 exhibiting an embodiment of a membrane overlaying waterways in the emitter.

With attention drawn to FIG. 3, membrane 8 can be seen in its intended position within emitter 10. Here membrane 8 is shown placed with its substantially planar upper side 28 facing the waterways 20, 200 in body member 16 and sealing them from below (i.e. from the inner side of the emitter). The first region 6 of membrane 8 is here placed sealing and overlaying substantially all of recess 20 and the second region 7 of membrane 8 is here placed sealing and overlaying substantially all of groove 200. In the shown embodiment, first region 6 may be thicker than second region 7, and this may be due to the different functions these regions may be configured to perform in the emitter.

In this example, first region 6 overlies substantially all of the recess 20 to therewith form a pressure regulating chamber of the emitter. In such a configuration, region 6 typically acts to regulate the flow rate flowing out of recess through the emitter's outlet by e.g. flexing inwards into recess 20. Thus, properties of region 6 may be chosen to exhibit e.g. a required flexibility for the intended use of region 6, with the thickness of the membrane in region 6 being a design parameter for defining such flexibility.

Region 7 covering here waterway 200 may be configured to form with waterway 200 a pressure reducing flow path for liquid, e.g. water, flowing through the emitter. Thus, an intended purpose of region 7 may in some cases be to simply seal waterway 200 from below, and thereby region 7 may possibly be designed to be thinner for this intended use and by that e.g. reduce the material of membrane for saving costs.

By way of a non-binding example; in a membrane made of an elastomeric material such as silicon or EPDM, region 6 may be chosen to be of a thickness of about 0.9 to 1.2 millimeters for providing properties suitable, for example, for controlling the flow of a liquid such as in pressure regulation and/or when used as a valve in a drip emitter. Region 7 may be of a thickness of about 0.3 to 0.6 millimeters for example for defining flow path waterways for example when fitted pressed between parts of an emitter one including a groove of the waterway.

In the exemplary embodiment of the emitter here shown; the waterways 20, 200 are provided in sequence communication and opening out of member 16 at a common bounding rim 27 extending up to an imaginary substantially planar plane (see rim 17 marked in FIG. 2). Thus, providing a membrane in accordance with as aspect of the invention, with a substantially planar side, such as side 28, to overlay waterways, such as 20, 200, may be advantageous in achieving an effective seal of these waterways, inter alia, at a location where these waterways meet.

The membrane's transition 32 between different thicknesses in adjacent regions; may be provided in various ways in accordance with the embodiments of the invention, as shown in the encircled examples at the top of FIG. 3. In some embodiments, the transition may be relatively sharp, possibly a step wise transition as shown at the left example. In other embodiments the transition may be more gradual, possibly slanting and/or curving, in order to bridge between the different thicknesses of adjacent regions of the membrane, as shown at the right example. In an embodiment, a location where a transition 32 between adjacent regions ends and a region begins; may be defined as the location from which onwards a thickness of the membrane is substantially constant for the extension of the region.

Figure 4A:
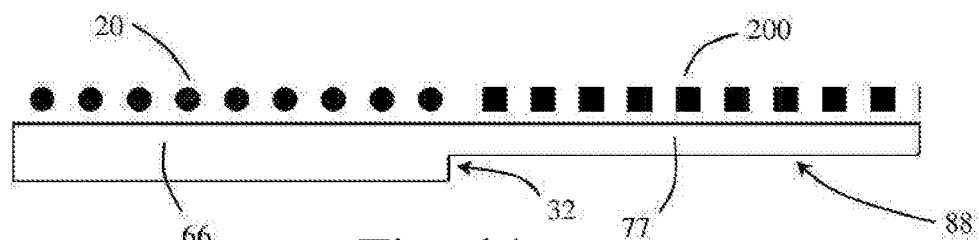
FIGS. 4A to 4D schematically show membranes in accordance with various embodiments of the present invention.

Attention is drawn to FIGS. 4A to 4D showing various embodiments of membranes according to the invention. In FIG. 4A a membrane 88 possibly similar to membrane 8 is shown; overlaying waterways possibly similar to the waterways 20, 200 seen in FIGS. 2 and 3; however here being represented by dotted lines. Membrane 88, as in membrane 8, may include two regions 66, 77 possibly similar to regions 6, 7 and being of different thicknesses that merge at a transition such as transition 32 seen and discussed with respect to FIG. 3. The thicknesses of regions 66, 77 may be defined according to the intended use of each region and the type of waterway each region overlays, defines and/or is exposed to.

Figure 4B:
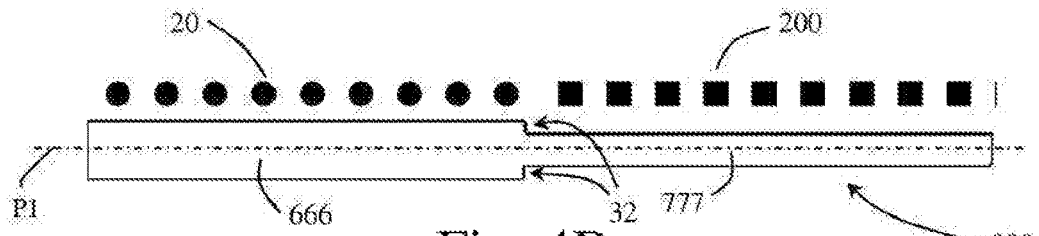

With attention drawn to FIG. 4B a membrane 888 according to an embodiment of the invention is shown having two regions 666, 777 such as regions 6, 7. Here however membrane 888 is shown including two transitions 32 one on its upper side 28 and another one its lower side 30 between its adjacent regions 666, 777. The two transitions 32 may not necessarily be similar and may each be any one of the examples discussed with respect to FIG. 3.

An advantage going along with a design of a membrane such as membrane 888 may be improved symmetry in relation to membrane 8, here provided by the membrane's additional symmetry about a median plane P1 dividing the thickness in each of its regions in half. Such improved symmetry may aid in simplifying an assembly of an emitter, such as emitter 10, by requiring less alignment measures for ensuring correct placement of the membrane in its intended orientation within the emitter.

Figure 4C:
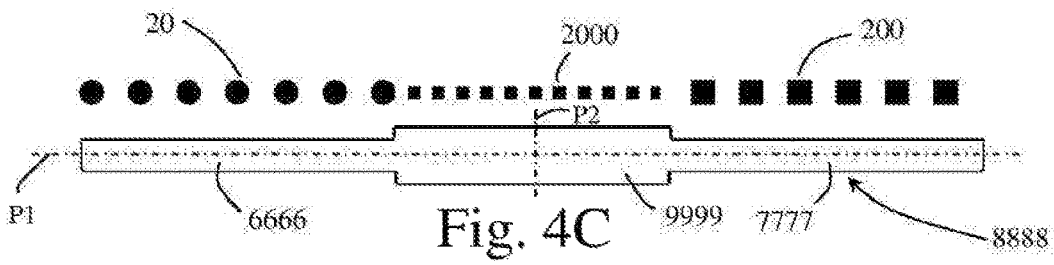
Figure 4D:
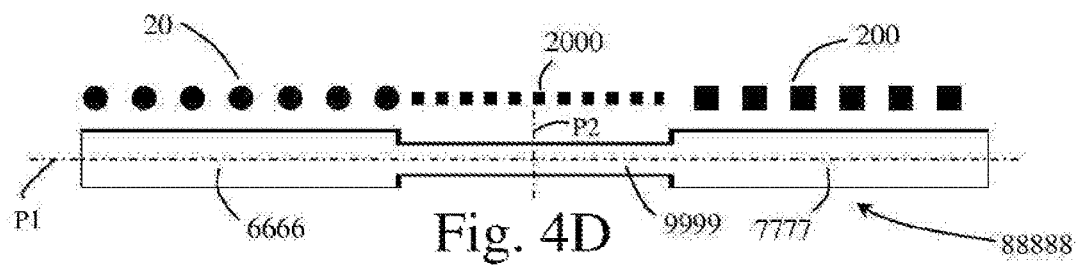

FIGS. 4C and 4D show embodiments of further membranes 8888, 88888 each including more than two regions e.g. three regions 6666, 7777, 9999; with transitions 32 formed between adjacent regions in these examples also on the upper and lower sides of the respective membranes. In these examples, thicknesses of non-adjacent regions such as regions 6666, 7777 need not necessarily be similar and may be defined according to the respective waterway that each region overlays, defines and/or is exposed to.

In an embodiment where the thicknesses of non-adjacent regions are similar, an improved symmetry of the membrane by provision of an additional symmetry about a plane P2 perpendicular to plane P1 may be achieved. Such improved symmetry accordingly may be advantageous in requiring less alignment measures (or none) for ensuring correct placement of a membrane in its intended orientation within the emitter.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Furthermore, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The present technology is also understood to encompass the exact terms, features, numerical values or ranges etc., if in here such terms, features, numerical values or ranges etc. are referred to in connection with terms such as "about, ca.", "substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

What is claimed is:

1. A drip emitter comprising:
at least first and second waterways for liquid flowing through the emitter; and
a drip emitter membrane comprising at least a first region overlaying substantially all of the first waterway and a second region overlaying substantially all of the second waterway, wherein:
the first and second regions have different thicknesses;
the thickness of the membrane is substantially constant over the first waterway;
the thickness of the membrane is substantially constant over the second waterway;
the first region seals substantially all of the first waterway; and
the second region seals substantially all of the second waterway.

2. The drip emitter of claim 1, wherein:
the drip emitter membrane comprises upper and lower sides and a peripheral surface extending between the two sides, and thickness is measured between the two sides; and
each of the waterways is overlaid by one of the two sides.

3. The drip emitter of claim 2, wherein:
one of the upper or lower sides is substantially continuously planar along the first and second regions; and
the other of the upper and lower sides comprises a step-wise thickness transition between the first and second regions.

4. A drip emitter comprising:
first and second body members, at least the first body member comprising a recess and at least one of the first and second members comprising an elongated groove;
a drip emitter membrane sandwiched between the first and second body members, the drip emitter membrane comprising first and second regions having different thicknesses; wherein:
the first region overlays substantially all of the recess to form an outlet control chamber for controlling flow rate out of the drip emitter; and
the second region overlays substantially all of the groove to define a flowpath.

5. The drip emitter of claim 4, comprising a step-wise thickness transition between the first and second regions.

6. The drip emitter of claim 4, wherein:
the drip emitter membrane comprises upper and lower sides and a peripheral surface extending between the two sides;
thickness is measured between the two sides; and
one of the upper and lower sides overlays both the recess and the elongated groove.

7. The drip emitter of claim 6, wherein:
the drip emitter membrane comprises a step-wise thickness transition between the first and second regions;
one of the upper or lower sides is substantially continuously planar along both the first and second regions; and
the step-wise thickness transition is formed on the other of the upper and lower sides.

8. The drip emitter of claim 6, wherein the second region has larger sides than the first region.

9. The drip emitter of claim 8, wherein the thickness of the first region is larger than the thickness of the second region.

10. The drip emitter of claim 8, wherein along each region the sides are generally planar.

11. The drip emitter of claim 5, wherein:
the recess and the elongated groove are formed on the same body member; and
the step-wise thickness transition is formed on a side of the drip emitter membrane not overlaying the recess and elongated groove.

12. A drip emitter comprising:
a first body member comprising a recess and an elongated groove in fluid communication with the recess;
a second body member attached to the first body member;
a drip emitter membrane sandwiched between the first and second body members, the drip emitter membrane comprising an upper side, a lower side and a peripheral surface between the upper and lower sides; and
the drip emitter membrane having a first region overlaying substantially all of the recess to form an outlet control chamber and a second region overlaying substantially all of the groove to define a flowpath, the first and second regions having different thicknesses; wherein:

the upper side overlays the recess at the first region and overlays the groove at the second region;

the lower side is planar in the first region, planar in the second region, and has at least one step-wise thickness transition between the first region and the second region.

13. The drip emitter of claim 12, wherein:

the first region is thicker than the second region;

the upper side is substantially continuously planar along the first and second regions; and the lower side has a single step-wise thickness transition between the first and second regions.

14. The drip emitter of claim 13, wherein:

on the lower side, the second region is larger than the first region.

15. The drip emitter of claim 12, wherein:

the first region is thicker than the second region;

the upper side is planar in the first region, planar in the second region, and has a single step-wise thickness transition between the first region and the second region;

the lower side has a single step-wise thickness transition between the first and second regions; and the drip emitter membrane is symmetric about a median plane dividing the thickness in each of the first and second regions in half.

16. The drip emitter of claim 15, wherein:

on the lower side, the second region is larger than the first region.

17. A drip emitter comprising:

a first body member;

a second body member attached to the first body member; and a drip emitter membrane sandwiched between the first and second body members, the drip emitter membrane comprising an upper side, a lower side and a peripheral surface between the upper and lower sides; wherein:

the drip emitter membrane has a first region, a second region and a third region located between the first and second regions;

the upper side is planar in each of the first, second and third regions and has a step-wise thickness transition between each pair of adjacent regions;

the lower side is planar in each of the first, second and third regions and has a step-wise thickness transition between each pair of adjacent regions;

the drip emitter membrane is symmetric about a median plane dividing the thickness in each of the first, second and third regions in half; and the drip emitter membrane is symmetric about a second plane which passes through the third region and is perpendicular to the median plane.

18. The drip emitter of claim 4, wherein:

the thickness of the membrane is substantially constant over the recess.

19. The drip emitter of claim 18, wherein:

the thickness of the membrane is substantially constant over the groove.

20. The drip emitter of claim 12, wherein:

the thickness of the membrane is substantially constant over the recess.

21. The drip emitter of claim 20, wherein:

the thickness of the membrane is substantially constant over the groove.

22. The drip emitter of claim 17, wherein:

the third region is thicker than both the first region and the second region.

23. The drip emitter of claim 17, wherein:

the third region is thinner than both the first region and the second region.

24. A drip emitter comprising:

at least first and second waterways for liquid flowing through the emitter; and a drip emitter membrane comprising at least a first region overlaying substantially all of the first waterway and a second region overlaying substantially all of the second waterway, wherein:

the first and second regions have different thicknesses;

the thickness of the membrane is substantially constant over the first waterway;

the thickness of the membrane is substantially constant over the second waterway; and the drip emitter membrane has a substantially continuously planar first side, a second side and a peripheral surface extending between the two sides, with the substantially continuously planar first side facing both the first and second waterways.

25. The drip emitter of claim 24, wherein:

the drip emitter's second side has a step between the first region and the second region.

* * * * *